No. 12,690. REISSUED SEPT. 3, 1907.
S. B. HAZARD.
RIDING ATTACHMENT FOR HARROWS.
APPLICATION FILED OCT. 5, 1906.
2 SHEETS—SHEET 1.
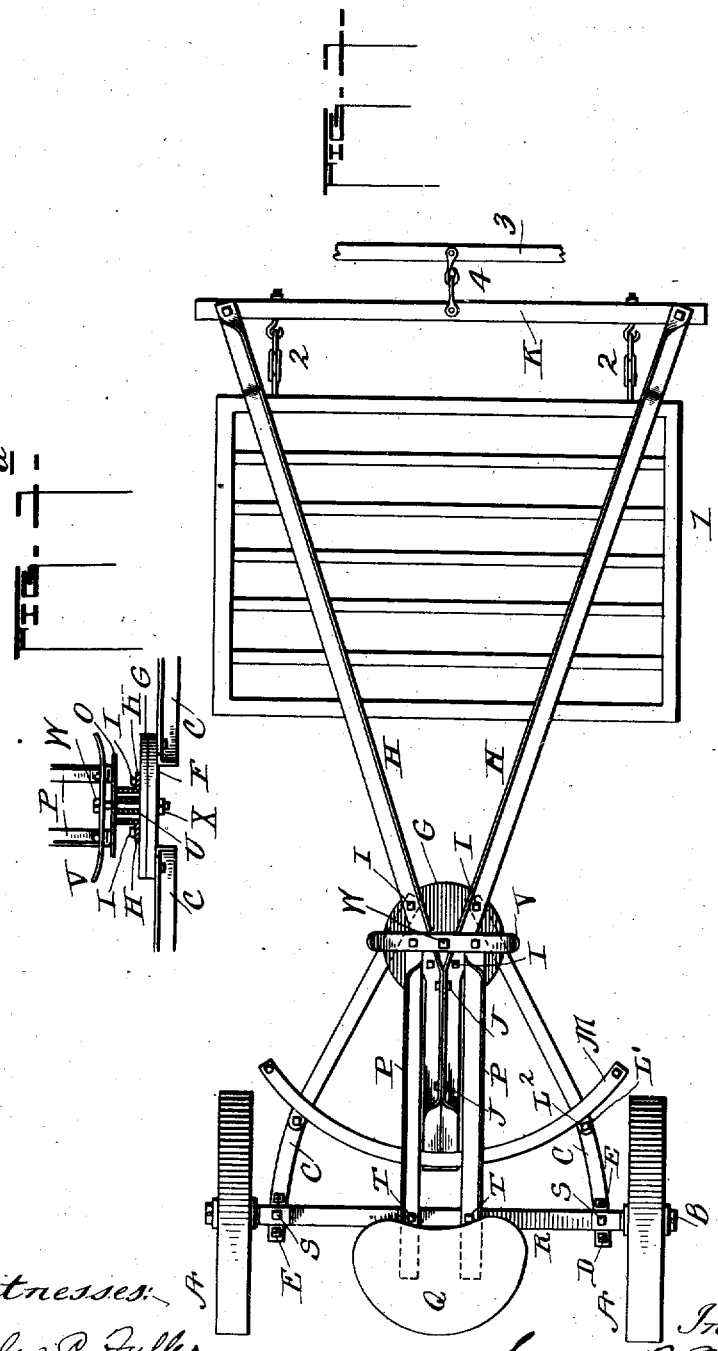
Witnesses:
Miles C. Fuller
J. H. Anderson
Inventor.
Samuel B. Hazard.
By Chas. A. LaPorte
Atty.
THE NORRIS PETERS CO., WASHINGTON, D. C.

No. 12,690. REISSUED SEPT. 3, 1907.
S. B. HAZARD.
RIDING ATTACHMENT FOR HARROWS.
APPLICATION FILED OCT. 5, 1906.
2 SHEETS—SHEET 2.
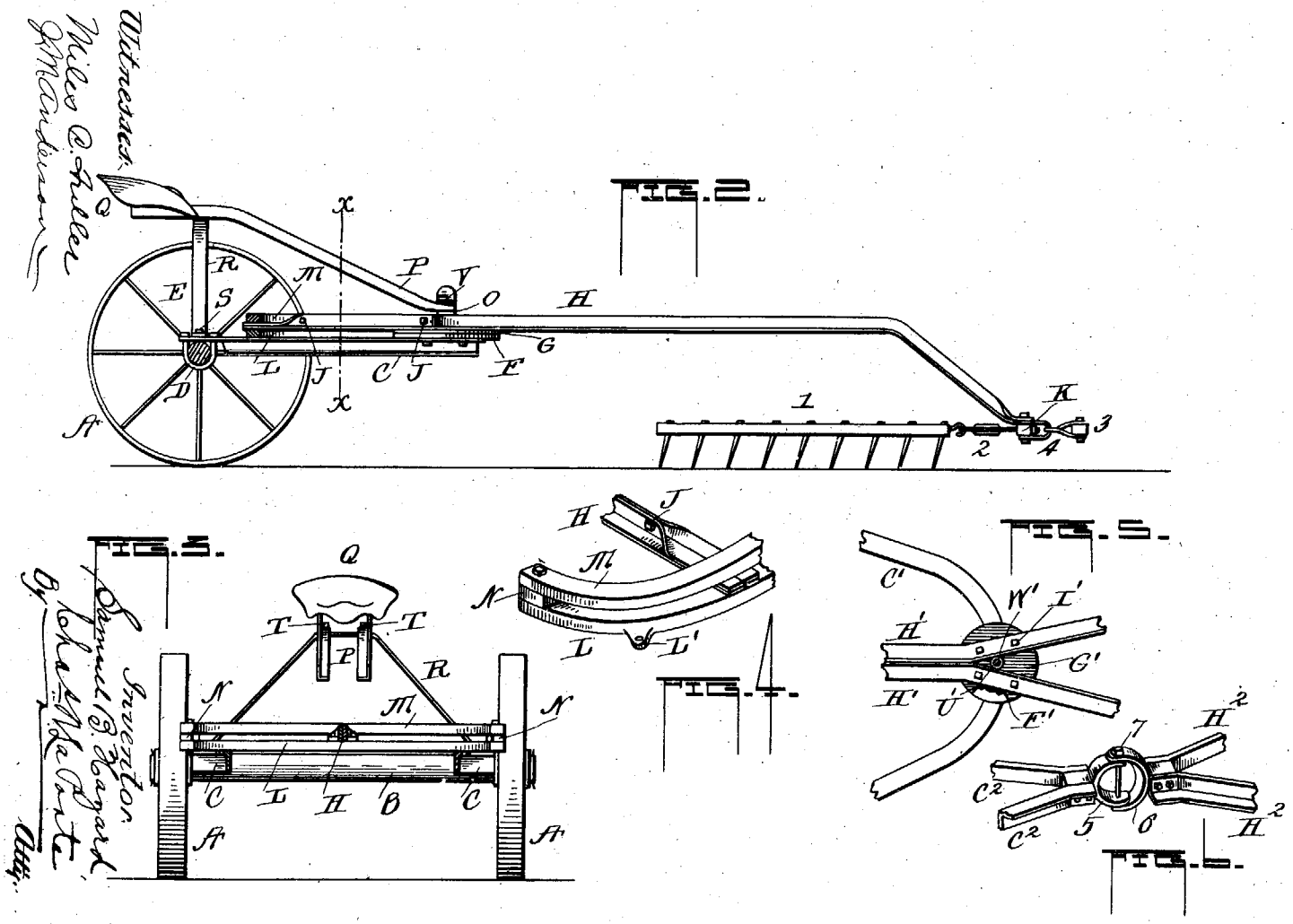
THE NORRIS PETERS CO., WASHINGTON, D. C.

UNITED STATES PATENT OFFICE.

SAMUEL B. HAZARD, OF PEORIA, ILLINOIS, ASSIGNOR TO ILLINOIS IMPLEMENT COMPANY, OF PEORIA, ILLINOIS, A CORPORATION OF ILLINOIS.

RIDING ATTACHMENT FOR HARROWS.

No. 12,690. Specification of Reissued Letters Patent. Reissued Sept. 3, 1907.

Original No. 796,330, dated August 1, 1905, Serial No. 233,589. Application for reissue filed October 5, 1906. Serial No. 337,664.

*To all whom it may concern:*

Be it known that I, SAMUEL B. HAZARD, a citizen of the United States, residing at Peoria, in the county of Peoria and State of Illinois, have invented certain new and useful Improvements in Riding Attachments for Harrows; and I do hereby declare that the following is a full, clear, and exact description of the invention, which will enable others skilled in the art to which it appertains to make and use the same.

This invention pertains to improvements in riding attachments for harrows.

The object of the invention is to provide a riding attachment for harrows in order to make harrowing a less laborious task.

A further object of the invention is to improve this class of devices by providing a construction that will be strong and rigid, while allowing a wide range of movement for turning around in the field.

A further object of the present invention is to provide a riding attachment for harrows that will be cheap because requiring little or no machine-work in its construction and requiring no skilled labor in assembling it.

In the appended drawings, forming part of this application, Figure 1 is a plan or top view of the complete device, showing the harrow with which it is connected. Fig. 1ª is a front elevation of the vertical pivotal connection for my improved attachment, parts thereof being in cross-section. Fig. 2 is a side elevation of the harrow and its attachment, the latter being in part section. Fig. 3 is a front elevation of the attachment through line *x x*, Fig. 2. Fig. 4 is a perspective view of the rear end of a divided reach for connection with the harrow, said rear end having slidable connection with a "circle". Fig. 5 is a top view of a modified form of pivotal connection of the reach. Fig. 6 is also a view of a modified form of said reach connection.

In the figures, A A indicate the wheels of my improved riding attachment, and B the axle carried thereby. Resting upon the axle close to each wheel is a bar C, constituting what are usually termed in wagon construction the "hounds". Said hounds are secured to the axle by means of clips, one of which is shown at D in Fig. 2, the extremities extending up through the member C and provided with nuts E. Carried at the forward ends of the hounds is a plate F, Figs. 1ª and 2, and upon said plate is placed a similar one G. Resting upon the latter plate are two bars H, secured thereto by bolts I. The rear ends of the bars H extend somewhat backward from the plates F G and lie parallel with each other and close together, being secured by bolts. At the said plates the bars diverge and extend forward for some considerable distance and horizontally and are then bent downward and forward, the ends having bolted thereto a bar K, which lies parallel with the axle B. The bars H are preferably constructed of angle-iron because light and strong, and the vertical limbs of said bars at the rear are bent down upon the horizontal limb, as shown, thus making a double-thick end which is perfectly stiff. The ends thus formed extend between an upper and lower member M L, respectively, of the "circle", said lower member being secured to the hounds C by means of the ears L′ and bolts $L^2$. The extremities L and M are separated by means of blocks N, Figs. 3 and 4, to allow the ends of the said bars H to have free play.

As shown in Fig. 1ª, across the bars H is placed a member O and upon said member rest the forward ends of a pair of bars P, whose rear ends carry the seat Q. Mounted upon the rear extremities of the hounds is a stirrup R, the form of which is shown in Fig. 3, this member being secured to said hounds by bolts S. The bars P are bent upward from the member O and rest upon the top of the said stirrup R, being secured by bolts T. In said Fig. 1ª a sleeve U is interposed between the member O and the plate G of sufficient length to slightly raise the said member O away from the bars H H. Now placed upon the ends of the bars P, immediately over the member O, is a foot-rest V, and a bolt W passes down through the latter, the member O, sleeve U, and the plates F and G being provided with a nut X. This bolt serves as the king-bolt and allows the bars H to move beneath the member O, the sleeve U keeping the latter and the bars separated at all times to reduce friction. It will be seen that all parts except the upper plate G and the bars H H maintain a rigid relation to one another, but allow free horizontal movement of the said bars.

The harrow (designated by the reference numeral 1) is linked to the bar K, before described, by the connections 2, while the draft attachment is shown at 3 and has its connection at 4.

As before stated, it is preferable to make the several members when convenient of angle-iron by reason of the lightness and strength thereof. The circle L M is cast in two pieces, the lower one having the integral ears or lugs L′ described. No machine-work is necessary in constructing my device, since all that is necessary is the drilling of a few holes to receive the several bolts shown. As constructed the device is light and strong and gives a full swing to the reach H H in all movements of the harrow 1.

While I have shown in the first three figures of the drawings one form of pivotal connection for the reach just mentioned, other forms may be used, such as shown in Figs. 5 and 6. In the former figure C′ indicates the hounds, having mounted thereon a plate F′, corresponding to F in the other figures. The upper plate G′ corresponds to G, which carries the bars H′. This is substantially like the other figures except that the bars C C in the said other figures are formed from one bar being bent into the form shown.

In Fig. 6 the plates F G are dispensed with, and between the bars $C^2$, which are the hounds, is clamped a fork 5. $H^2$ are the bars of the reach, between whose rear ends is held a similar fork 6, slightly larger than the fork 5 in order to pass over it. A king-bolt 7 passes through both forks and allows the desired horizontal pivotal motion, and by having the forks of considerable reach between their arms, as shown, the bars $C^2$ and $H^2$ are maintained in a horizontal position relatively. This simplifies construction and cheapens the device materially. I may use any of these forms or even others as I see best suited to the work, and it will be understood, therefore, that it is not the intention to limit the attachment to any fixed construction.

The harrow 1 may be of any approved type; but I have merely indicated a frame having teeth therein, since I do not lay any claim to this portion of the machine broadly, but in combination with the riding attachment.

Having thus fully described my invention, I claim:

1. In combination with a harrow, a bar forward of the same with which it is connected, draft attachments on said bar, a pair of wheels rearward of the harrow, a pair of hounds carried between the wheels, a seat carried on the hounds, a reach comprising two arms pivoted at the forward ends of the hounds and lying parallel with one another rearward of the pivot, but diverging and extending forward from the pivot, the forward ends having attachment with the bar forward of the harrow, and means rearward of the pivot of the reach for sustaining the said reach as against vertical movement but permitting a free horizontal movement for the purposes set forth.

2. In combination with a harrow, a bar forward thereof and to which it is connected, draft attachments for the bar, a wheeled frame in the rear of the harrow, a seat carried thereby, a bifurcated reach pivoted to the said wheeled frame, the extremities extending forward and diverging and having connection with the bar forward of the harrow substantially as shown, means for preventing vertical movement of the reach at its rear end, and a foot-rest placed at the pivot of said reach for the purposes set forth.

3. In combination with a harrow, a bar forward thereof and having connection therewith, draft attachments on the bar, a pair of reaches attached at their forward ends to the bar and extending rearward and converging near their rear ends and thence extending parallel with each other, a supporting plate beneath the first, a wheeled frame to which the second plate is secured, a guide carried by the wheeled frame between which the rear ends of the reach members are slidably held for the purposes set forth, and a pivot for the plates for permitting horizontal pivotal movement of the reaches and wheeled frame.

4. In combination with a harrow, a bar forward thereof and having connection therewith, draft attachments on the bar, a pair of reaches attached at their forward ends to the bar and extending rearward and converging near their rear ends and thence extending parallel with each other, a supporting-plate to which the converging ends are secured, a second plate beneath the first, a wheeled frame to which the second plate is secured, a guide carried by the wheeled frame between which the rear ends of the reach members are slidably held for the purposes set forth, a pivot for the plates for permitting horizontal pivotal movement of the reaches and wheeled frame, a seat carried on the wheeled frame, and a foot-rest located at the said pivot substantially as set forth.

5. In combination with a harrow, a draft-bar forward thereof and with which it is connected, a wheeled frame rearward of the harrow, a pair of reach-arms of angle-iron secured at their forward ends to the draft-bar, and extending upward and then rearward therefrom, said arms converging near their rear ends and lying parallel with each other at the rear ends, the extremities being flattened and slidably held within the said wheeled frame, and pivotal connection between the reaches and said frame, the latter preventing vertical tilting movement of the frame and reaches at the pivot thereof.

6. In a riding attachment of the class described, the combination with convergently disposed reach bars having their rear ends connected, of a trailing wheel frame pivotally connected at its front end to the reach-bars in advance of their connected rear ends and having a free swinging movement with respect thereto, said frame being wider at its rear than at its front end, and including an axle, mounted on its rear end and spaced wheels journaled on the axle and disposed on opposite sides of the frame and the rear connected ends of the reach bars.

7. In a riding attachment of the class described, the combination with convergently disposed reach bars having their rear ends connected, of a plate connecting the reach bars in advance of their connected ends and a trailing supporting frame having its front end connected to a plate, which said plate is pivotally connected to the plate connecting the reach bars, said wheel frame including an axle having its ends projecting beyond the opposite sides of the frame, and wheels journaled on the projecting ends and disposed in vertical planes that extend on opposite sides of the rear ends of the reach bars.

8. In a riding attachment of the class described, the combination with convergently disposed reach bars having their rear ends connected, of a member connecting the reach bars in advance of their connected ends, and a trailing supporting frame having its front end pivoted to the said member and having a free swinging movement with respect thereto, said wheel frame including an axle having its ends projecting beyond the opposite sides of the frame, and wheels journaled on the projecting ends and disposed in vertical planes that extend on opposite sides of the rear ends of the reach bars.

In testimony whereof, I affix my signature in the presence of two witnesses.

SAMUEL B. HAZARD.

Witnesses:
CHAS. N. LA PORTE,
W. C. GARRARD.